United States Patent
Huang et al.

(10) Patent No.: US 8,018,543 B2
(45) Date of Patent: Sep. 13, 2011

(54) LIQUID CRYSTAL DISPLAY PANEL WITH ELECTROSTATIC PROTECTION STRUCTURE

(75) Inventors: Chun-Kang Huang, Taichung (TW); Chun-Chieh Wu, Kaohsiung County (TW); Chia-Li Su, Taichung County (TW)

(73) Assignee: Wintek Corporation, Taichung (TW)

( * ) Notice: Subject to any disclaimer, the term of this patent is extended or adjusted under 35 U.S.C. 154(b) by 219 days.

(21) Appl. No.: 12/485,203

(22) Filed: Jun. 16, 2009

(65) Prior Publication Data
US 2009/0310052 A1 Dec. 17, 2009

(30) Foreign Application Priority Data
Jun. 16, 2008 (TW) .............................. 97122411 A

(51) Int. Cl.
G02F 1/1333 (2006.01)
G02F 1/1339 (2006.01)

(52) U.S. Cl. ............................ 349/40; 349/158; 349/153

(58) Field of Classification Search .................... 349/40, 349/158, 153
See application file for complete search history.

(56) References Cited

U.S. PATENT DOCUMENTS
6,013,923 A * 1/2000 Huang ............................ 257/59
6,287,899 B1 * 9/2001 Park et al. ...................... 438/149

FOREIGN PATENT DOCUMENTS
CN         2789801 Y  * 6/2006
CN      CN 2789801      6/2006

OTHER PUBLICATIONS
English language translation of abstract of CN 2789801 (published Jun. 21, 2006).

* cited by examiner

Primary Examiner — Mike Qi
(74) Attorney, Agent, or Firm — Thomas|Kayden

(57) ABSTRACT

A liquid crystal display (LCD) panel including a first substrate, a second substrate, a liquid crystal layer, a sealant and an electrostatic protection structure is provided. The first substrate and the second substrate are disposed in parallel. The sealant is for sealing the liquid crystal layer between the first substrate and the second substrate. The electrostatic protection structure is disposed within a non-display area outside the sealant. The electrostatic protection structure includes a first line disposed on the first substrate and surrounding the edge of the first substrate.

14 Claims, 12 Drawing Sheets

LIQUID CRYSTAL DISPLAY PANEL WITH ELECTROSTATIC PROTECTION STRUCTURE

This application claims the benefit of Taiwan application Serial No. 97122411, filed Jun. 16, 2008, the subject matter of which is incorporated herein by reference.

BACKGROUND OF THE INVENTION

1. Field of the Invention

The invention relates in general to a liquid crystal display (LCD) panel, and more particularly to an LCD panel with an electrostatic protection structure.

2. Description of the Related Art

Nowadays, electronic products are very popular and widely used in people's everyday life. However, static electricity is everywhere in the environment, so that almost all electronic products are subject to the interference of electrostatic discharge or even damaged by electrostatic discharge.

Conventionally, electrostatic charges are accumulated at two substrates of the LCD panel. When too many electrostatic charges are accumulated, the internal circuits of the substrates would malfunction or even be damaged. Although an electrostatic discharge circuit is designed in the internal circuit of the substrate of the conventional LCD panel, the electrostatic discharge circuit can only protect the internal circuits from the static electricity less than 2 KV, so the reliability for the electrostatic protection of the LCD panel is not well. Therefore, how to design a quality discharge structure capable of effectively resolving the static electricity problem to avoid the malfunction of the LCD panel and prolong the lifespan of the LCD panel has become an imminent issue to manufacturers.

SUMMARY OF THE INVENTION

The invention is directed to a liquid crystal display (LCD) panel. A ring-type electrostatic protection structure is disposed at the gap between two substrates of the LCD panel. The electrostatic protection of the LCD panel is enhanced with the disposition of the electrostatic protection structure. In addition, the electrostatic protection structure can be simultaneously formed in the step of forming the ITO structure of the LCD panel without incurring additional manufacturing cost, so as to increase the product competitiveness.

According to the present invention, a liquid crystal display (LCD) panel including a first substrate, a second substrate, a liquid crystal layer, a sealant and an electrostatic protection structure is provided. The first substrate and the second substrate are disposed in parallel to each other. The sealant is for sealing the liquid crystal layer between the first substrate and the second substrate. The electrostatic protection structure is disposed within a non-display area outside the sealant. The electrostatic protection structure includes a first line disposed on the first substrate and surrounding the inner edge of the first substrate.

The invention will become apparent from the following detailed description of the preferred but non-limiting embodiments. The following description is made with reference to the accompanying drawings.

DETAILED DESCRIPTION OF THE INVENTION

Figure 1:
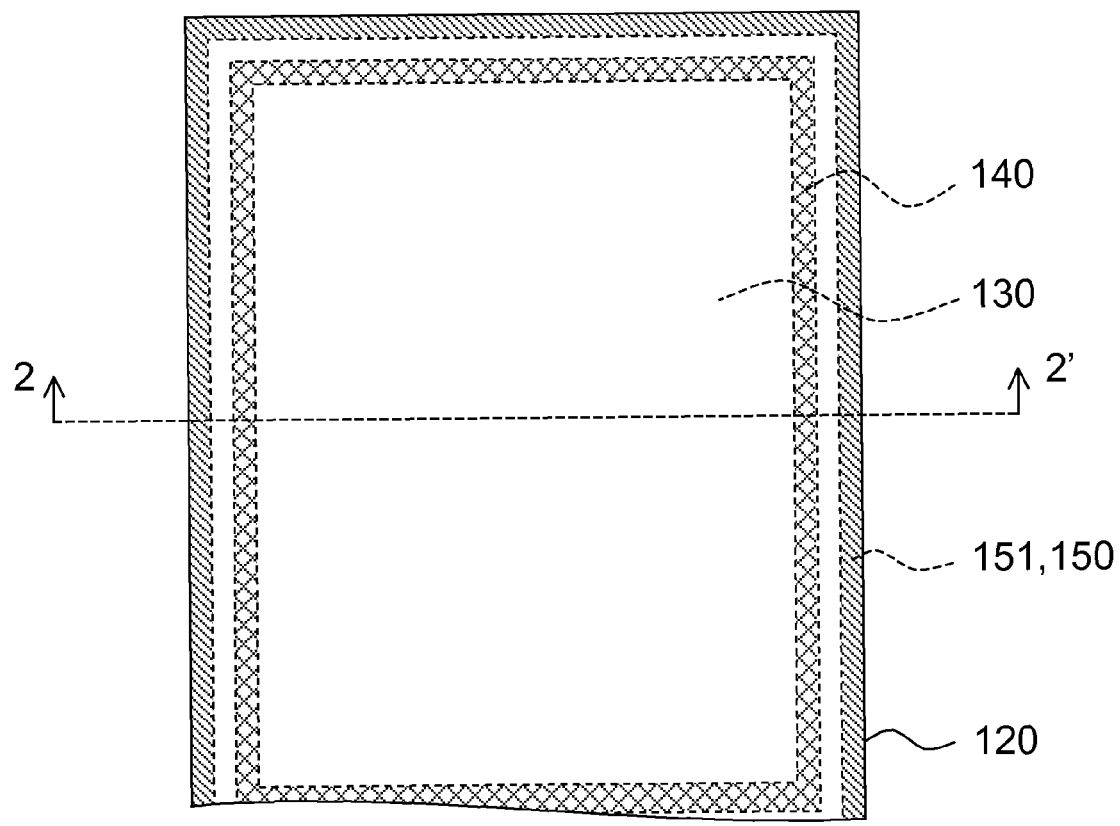
FIG. 1 shows a partial diagram of an LCD panel according to a first embodiment of the invention.

A liquid crystal display (LCD) panel is provided in following embodiments of the invention. The LCD panel includes a first substrate, a second substrate, a liquid crystal layer, a sealant and an electrostatic protection structure. The electrostatic protection structure includes a first line disposed on the first substrate and surrounding the inner edge of the first substrate for discharging accumulated electrostatic charges, such that the LCD panel has excellent electrostatic protection effect. The above-mentioned first substrate can be a thin film transistor (TFT) substrate or a color filter substrate.

Nine embodiments are disclosed below, so that anyone who is skilled in the related art of the invention can distinctly understand the scope of the invention. The first embodiment is illustrated by accompanying with FIGS. 1~4, and the second embodiment to the ninth embodiment are illustrated by accompanying with FIGS. 5~12, respectively. The embodiments of the invention are used for exemplifying the invention only not for limiting the scope of the invention. Furthermore, some components are omitted in the drawings to highlight the features of the invention.

First Embodiment

In the first embodiment, the electrostatic protection structure includes a first line. The first substrate is a TFT substrate, the second substrate is a color filter substrate, and the first line is disposed on the TFT substrate and surrounds the edge of the TFT substrate.

Figure 2:
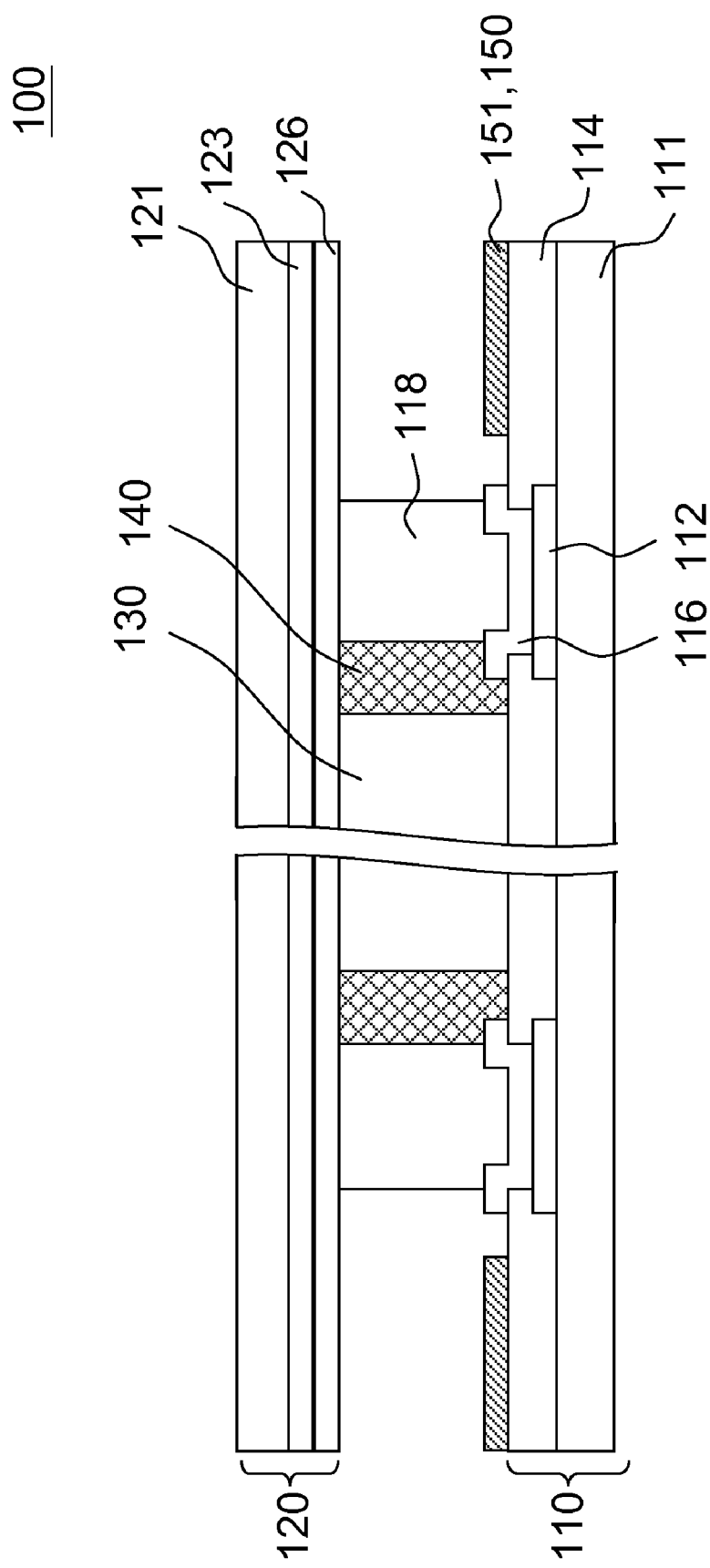
FIG. 2 shows a cross-section view of the LCD panel in FIG. 1 along the cross-sectional line 2-2'.

Referring to both FIG. 1 and FIG. 2, a partial diagram of an LCD panel according to a first embodiment of the invention is shown in FIG. 1, and a cross-section view of the LCD panel in FIG. 1 along the cross-sectional line 2-2' is shown in FIG. 2. The LCD panel 100 includes a TFT substrate 110, a color filter substrate 120, a liquid crystal layer 130, a sealant 140 and an electrostatic protection structure 150. The TFT substrate 110 and the color filter substrate 120 are disposed in parallel to each other. The sealant 140 seals the liquid crystal layer 130 between the TFT substrate 110 and the color filter substrate 120. The inner area of the sealant 140 is a display area of the LCD panel 100. The display area is substantially the part of the liquid crystal layer 130 sealed by the sealant 140 as indicated in FIG. 1. The electrostatic protection structure 150 is disposed within a non-display area outside the sealant 140. The TFT substrate 110 includes a transparent substrate 111, a common electrode line 112, an insulating layer 114, an ITO electrode layer 116 and an electric conductor 118. The color filter substrate 120 includes a transparent substrate 121, a black matrix layer 123 and a common electrode 126. The electric conductor 118 is electrically connected to the ITO electrode layer 116 of the TFT substrate 110 and the common electrode 126 of the color filter substrate 120.

In the present embodiment of the invention, the first line 151 of the electrostatic protection structure 150 is disposed on the insulating layer 114 of the TFT substrate 110 and surrounds the inner edge of the TFT substrate 110.

Figure 3:
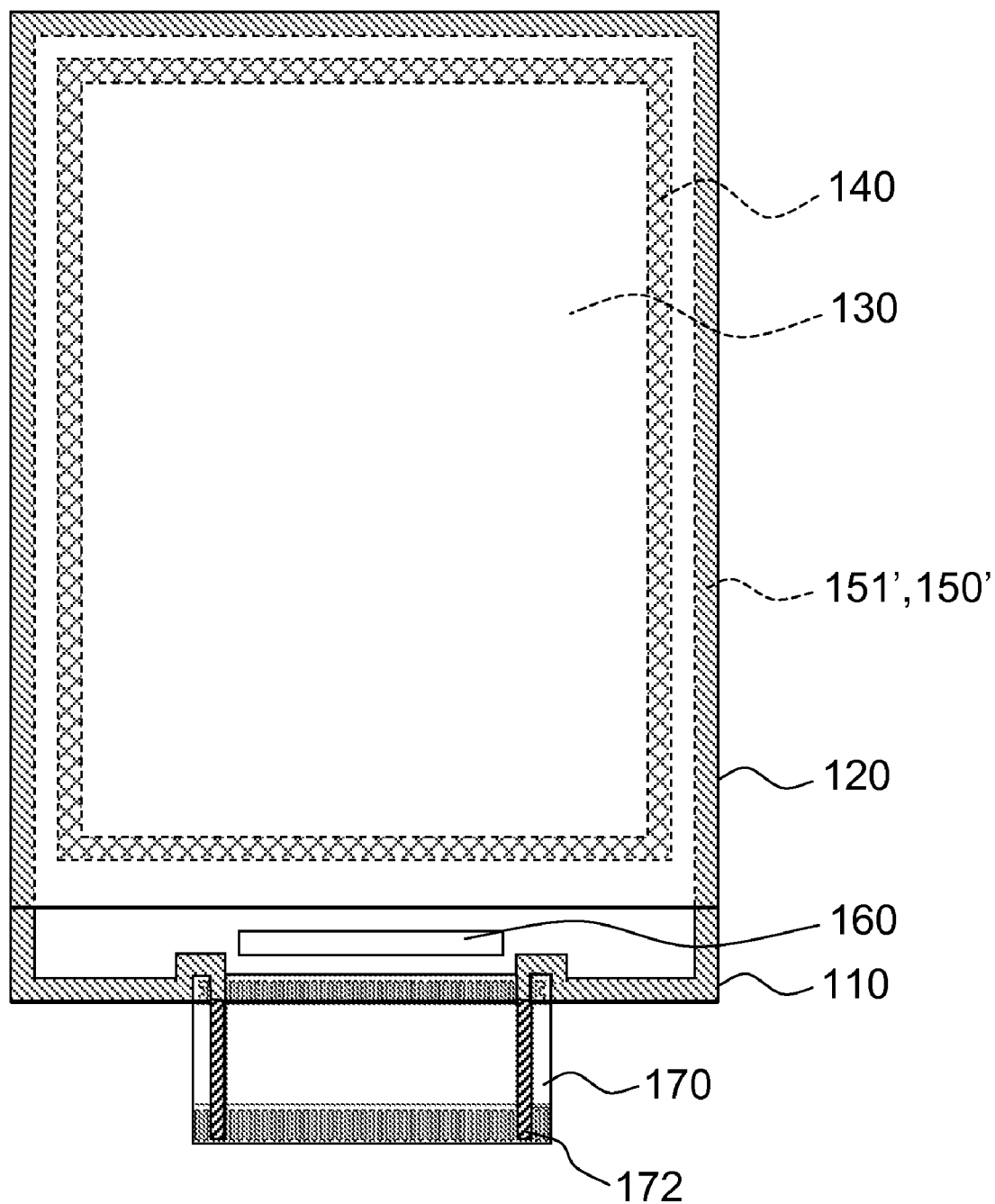
FIG. 3 shows an example of an LCD panel with a first line being electrically connected to a grounding lead.

The first line 151 can be floating or grounded. Preferably, the first line 151 is grounded. Referring to FIG. 3, an example of an LCD panel with a first line being electrically connected to a grounding lead is shown. The components in FIG. 3 which are the same as those in FIG. 1 and have the same functions are designated with the same numbers, and the components are not repeatedly described herein. As indicated FIG. 3, the LCD panel 100' further includes an integrated circuit chip 160 and a flexible circuit board 170. The flexible circuit board 170 has at least one grounding lead 172 disposed thereon. In FIG. 3, the integrated circuit chip 160 and the flexible circuit board 170 are both disposed on the TFT substrate 110, for example. The first line 151' exemplified by being grounded can be electrically connected to the grounding lead 172 of the flexible circuit board 170.

The experimental results show that electrostatic discharge normally occurs at the gap between the TFT substrate 110 and the color filter substrate 120. When a high voltage static electricity is discharged, an electric arc may even generate between the first substrate 110 and the second substrate 120. In the present embodiment of the invention, with the electrostatic protection structure 150 being disposed between the first substrate 110 and the second substrate 120 and surrounding the inner edge of the substrate, the electrostatic charges accumulated on the first substrate 110 and the second substrate 120 and between the first substrate 110 and the second substrate 120 can be efficiently discharged, so as to achieve excellent electrostatic protection effect.

Figure 4:
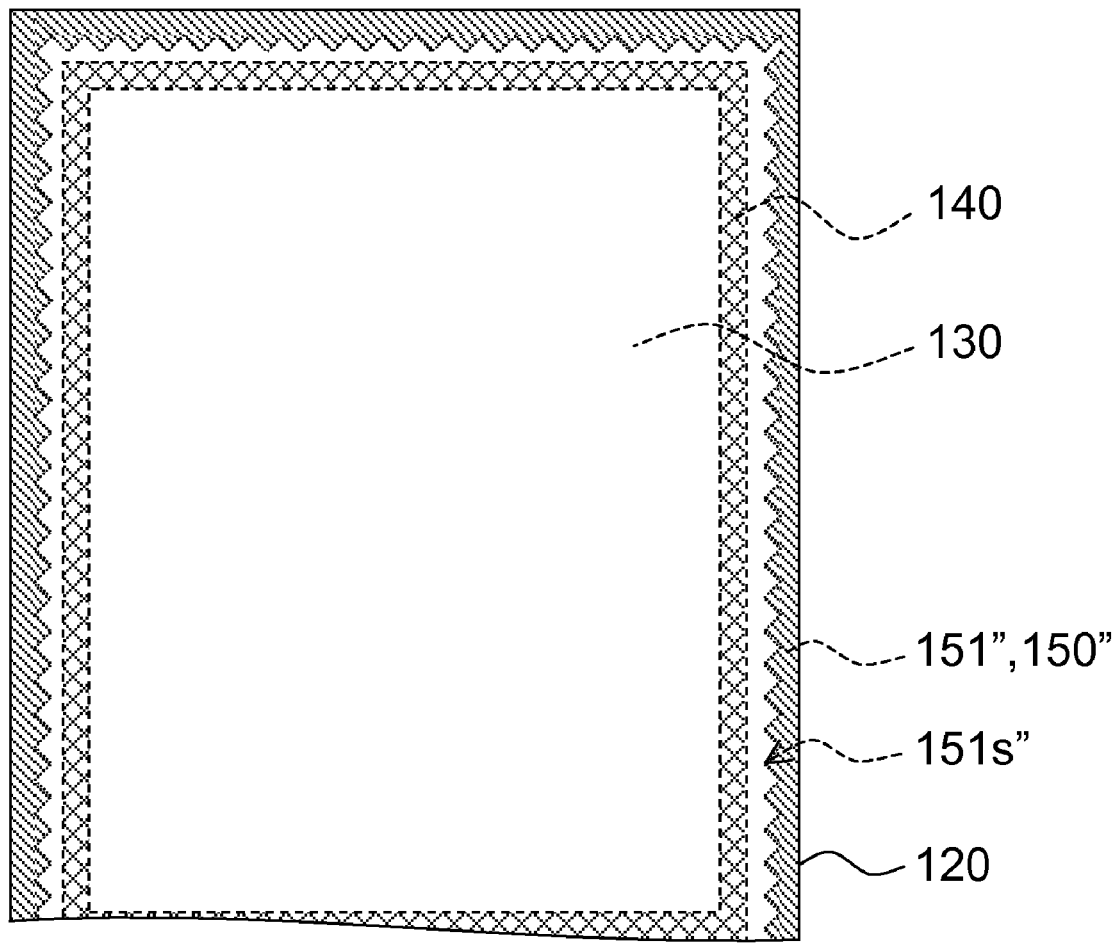
FIG. 4 shows a partial diagram of an LCD panel whose first line is saw-toothed at the side facing the sealant.

Moreover, the side of the first line facing the sealant is preferably saw-toothed. Referring to FIG. 4, a partial diagram of an LCD panel whose first line is saw-toothed at the side facing the sealant is shown. The components in FIG. 4 which are the same as those in FIG. 1 and have the same functions are designated with the same numbers, and the components are not repeatedly described herein. As indicated in FIG. 4, the first line 151" of the electrostatic protection structure 150" of the LCD panel 100" has many sharp ends 151s" for increasing the possibility of point discharge, such that the electrostatic charges are more easily to be transmitted to the first line 151" and be discharged from the first line 151" accordingly. Preferably, the first line 151" and the ITO electrode layer of the TFT substrate are made of the same material, such as indium tin oxide (ITO). Thus, the first line can be simultaneously formed in the step of forming the ITO structure of the TFT substrate without incurring additional manufacturing cost.

Second Embodiment

Figure 5:
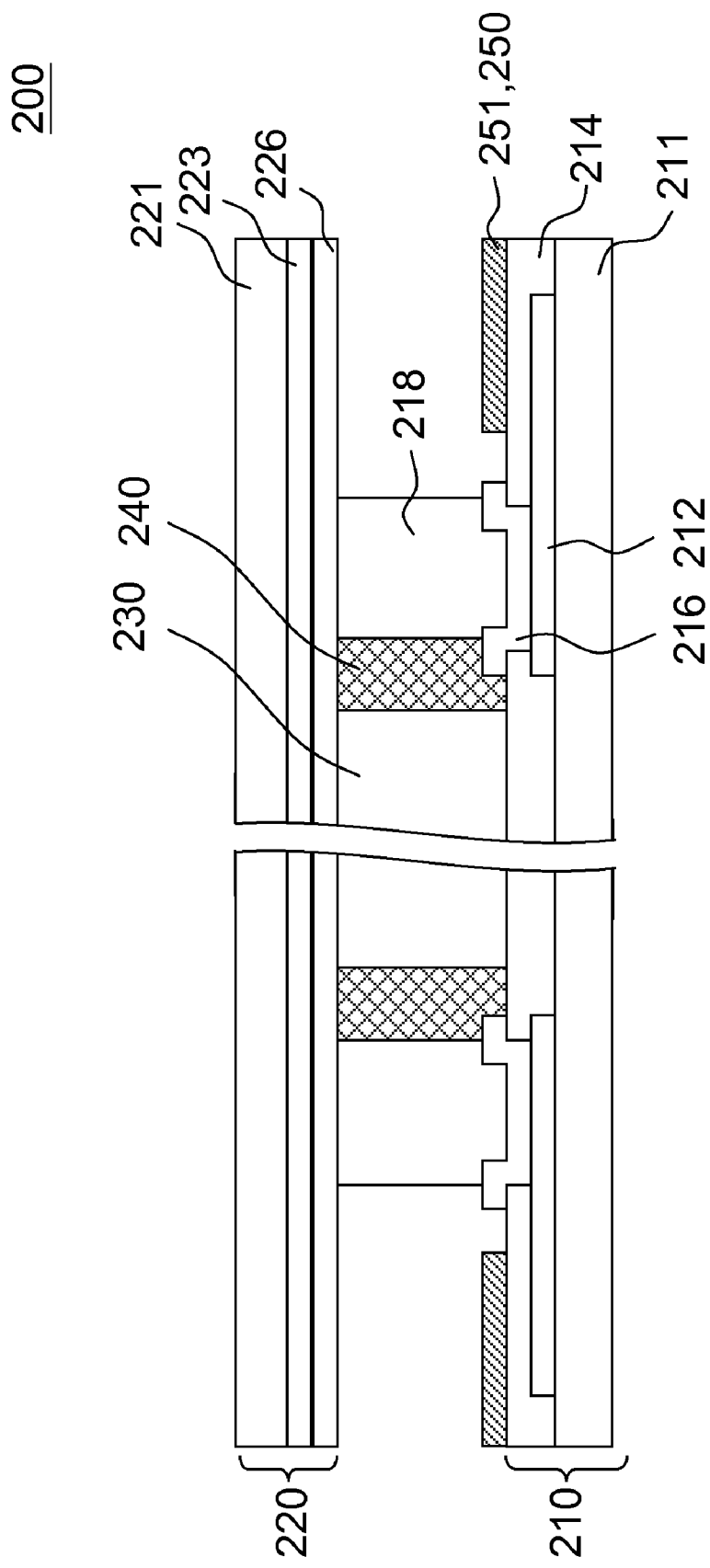
FIG. 5 shows a cross-section view of an LCD panel according to a second embodiment of the invention.

The second embodiment differs from the first embodiment in the disposition relationship between the common electrode line and the electrostatic protection structure. In the second embodiment, the electrostatic protection of the LCD panel is further enhanced by changing the disposition relationship between the common electrode line and the electrostatic protection structure. Referring to FIG. 5, a cross-section view of an LCD panel according to a second embodiment of the invention is shown. As FIG. 5 can be viewed as a modification of FIG. 2, similar components in FIG. 5 are designated with similar numbers and are not repeatedly described herein.

In FIG. 5, the first line 251 is partially overlapped and electrically insulated from the common electrode line 212, so as to form a capacitor structure at the overlapped part between the first line 251 and the common electrode line 212. When electrostatic discharge occurs, the capacitor structure generates capacitor coupling effect for discharging the electrostatic charges of the common electrode line 212 via the first line 251. Thus, the electrostatic charges accumulated at the common electrode line 212 can be quickly discharged via the first line 251.

Third Embodiment

Figure 6:
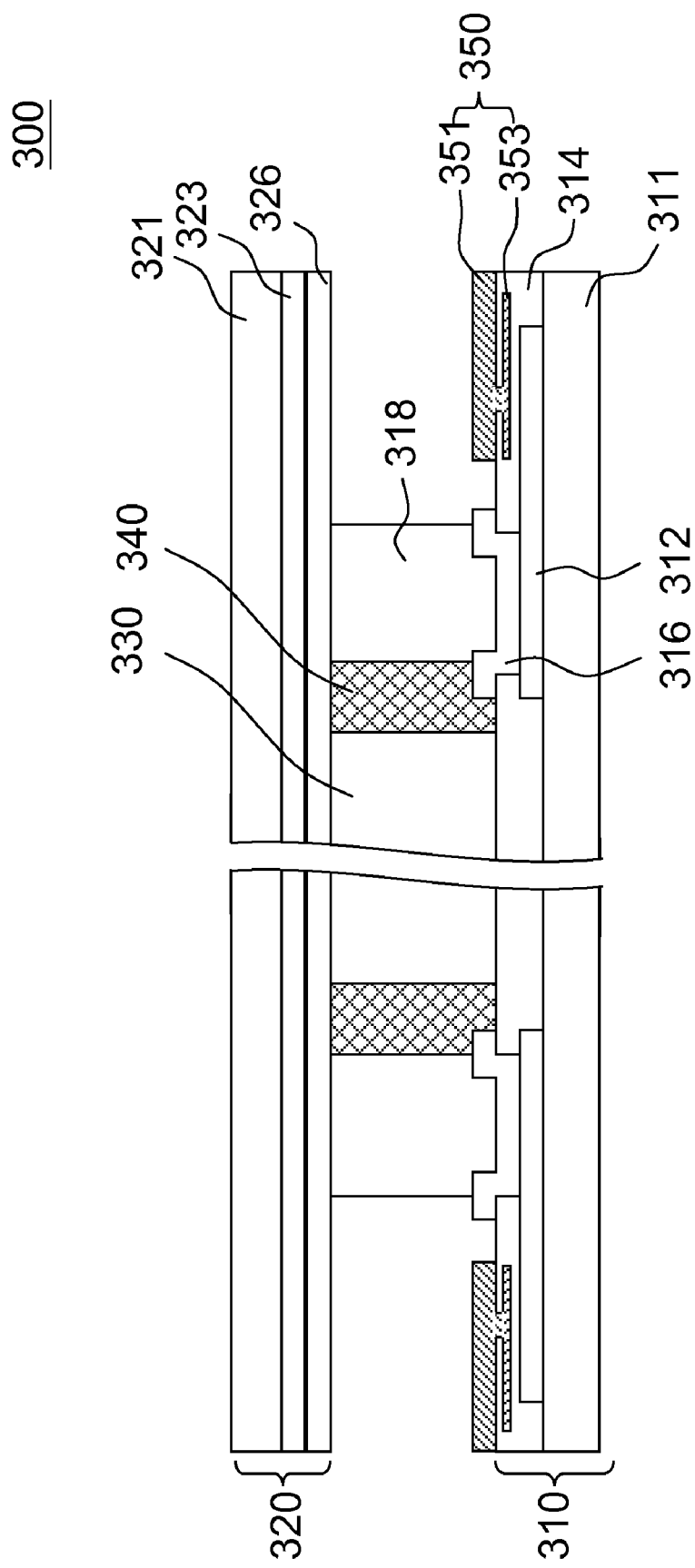
FIG. 6 shows a cross-section view of an LCD panel according to a third embodiment of the invention.

The third embodiment differs from the second embodiment in that a metal layer is disposed between the first line and the common electrode line. In the present embodiment of the invention, the metal layer is used for increasing the equivalent capacitance of the capacitor structure so as to further enhance the electrostatic protection of the LCD panel. Referring to FIG. 6, a cross-section view of an LCD panel according to a third embodiment of the invention is shown. As FIG. 6 can be viewed as a modification of FIG. 5, similar components in FIG. 6 are designated with similar numbers and are not repeatedly described herein.

In FIG. 6, the electrostatic protection structure 350 further includes a metal layer 353 positioned between the first line 351 and the common electrode line 312, and a part of the metal layer 353 is covered by the insulating layer 314. The metal layer 353 is electrically connected to the first line 351 and is partially overlapped and electrically insulated from the common electrode line 312 so as to form a capacitor structure at the overlapped part between the metal layer 353 and the common electrode line 312. As the distance between the metal layer 353 and the common electrode line 312 in the present embodiment is shorter than the distance between the first line 251 and the common electrode line 212 in the second embodiment, the equivalent capacitance of the capacitor structure in the present embodiment is larger than that in the second embodiment. Thus, when electrostatic charges are accumulated at the common electrode line 312, the electrostatic charges can be quickly and easily discharged via the metal layer 353 and the first line 351.

Fourth Embodiment

The fourth embodiment is similar to the first embodiment. The difference between the two embodiments is that the first line of the fourth embodiment is disposed on the color filter substrate and surrounds the edge of the color filter substrate. The components and the functions which are similar to those in the first embodiment are not repeatedly described in the following.

Figure 7:
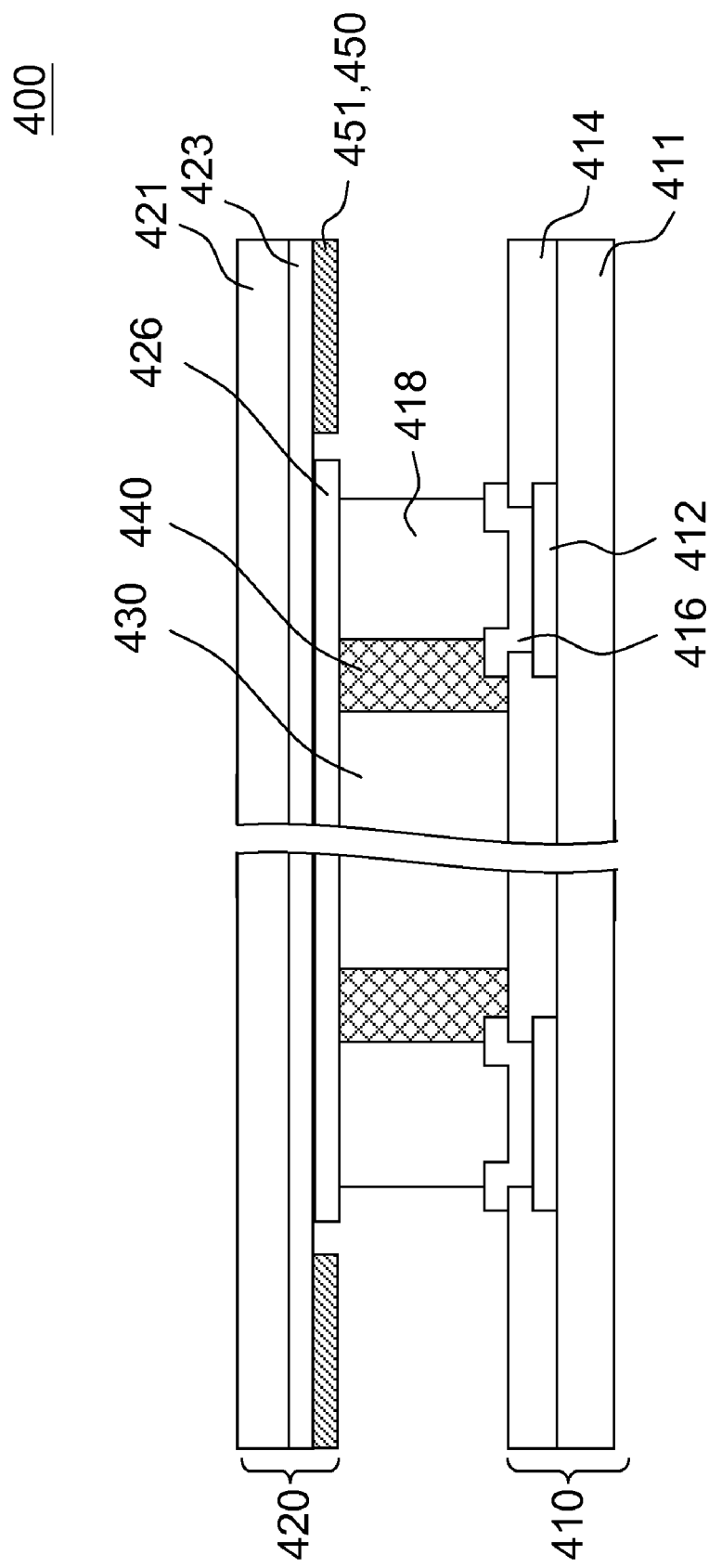
FIG. 7 shows a cross-section view of an LCD panel according to a fourth embodiment of the invention.

Referring to FIG. 7, a cross-section view of an LCD panel according to a fourth embodiment of the invention is shown. As indicated in FIG. 7, the LCD panel 400 includes a TFT substrate 410, a color filter substrate 420, a liquid crystal layer 430, a sealant 440 and an electrostatic protection structure 450. The electrostatic protection structure 450 includes a first line 451. The TFT substrate 410 includes a transparent substrate 411, a common electrode line 412, an insulating layer 414, an ITO electrode layer 416 and an electric conductor 418. The color filter substrate 420 includes a transparent substrate 421, a black matrix layer 423 and a common electrode 426. The electric conductor 418 is coupled to the ITO electrode layer 416 and the common electrode 426. The first line 451 of the present embodiment is disposed on the color filter substrate 420 and surrounds the inner edge of the color filter substrate 420. Likewise, the first line 451 can be floating or grounded.

The first line 451 of the present embodiment which is disposed on and surrounds the color filter substrate 420 has the same function as the first line in the first embodiment. That is, the first line 451 can discharge the accumulated electrostatic charges so as to achieve excellent electrostatic protection effect. In addition, the inner side of the first line 451 can also be saw-toothed for increasing the possibility of point discharge, such that the electrostatic charges are more easily to be transmitted to the first line 451 and be discharged from the first line 451 accordingly. Moreover, the first line 451 and the common electrode 426 of the color filter substrate 420 can be made of the same material, such that the first line 451 can be simultaneously formed in the step of forming the ITO structure of the color filter substrate without incurring additional manufacturing cost.

Fifth Embodiment

Figure 8:
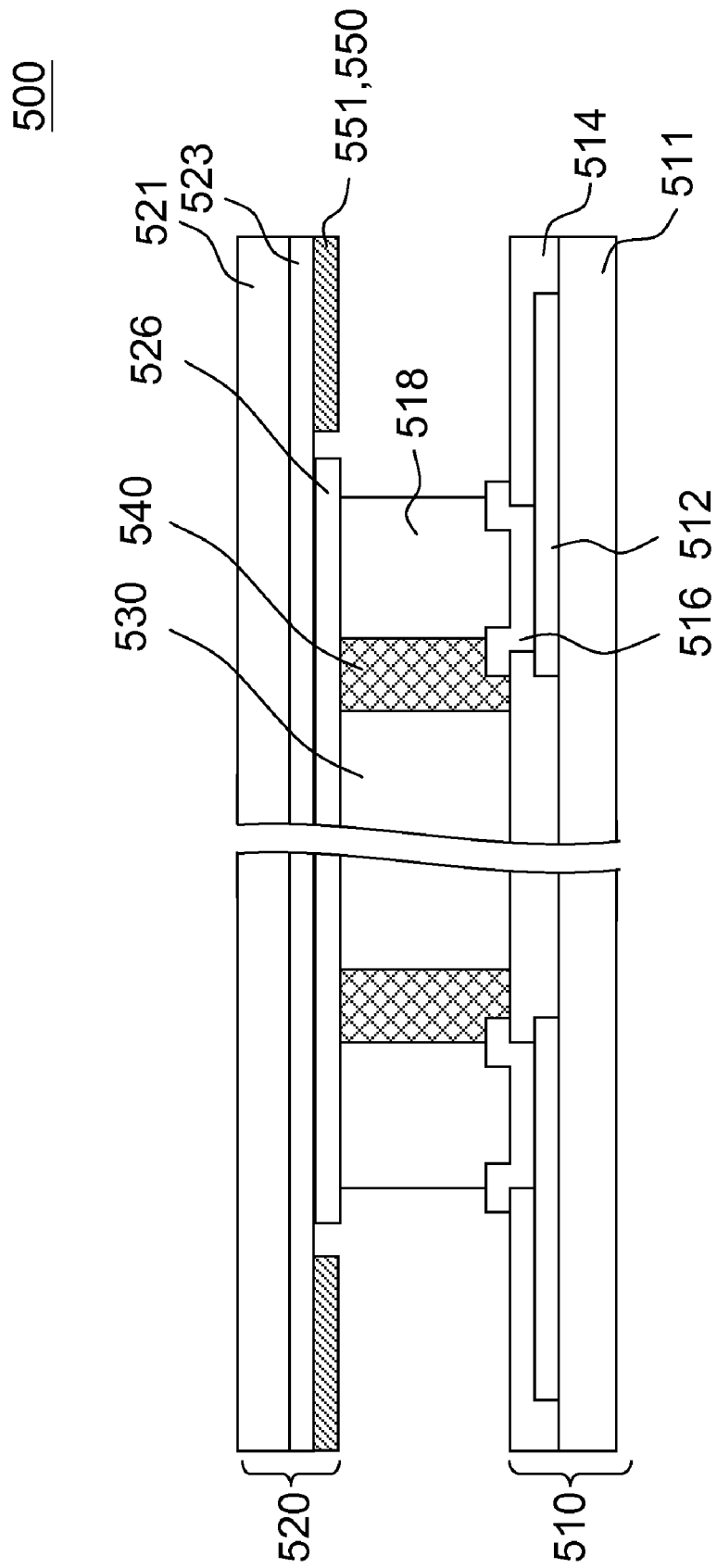
FIG. 8 shows a cross-section view of an LCD panel according to a fifth embodiment of the invention.

The fifth embodiment differs from the fourth embodiment in the disposition relationship between the common electrode line and the electrostatic protection structure. In the present embodiment of the invention, the electrostatic protection of the LCD panel is further enhanced by changing the disposition relationship between the common electrode line and the electrostatic protection structure. Referring to FIG. 8, a cross-section view of an LCD panel according to a fifth embodiment of the invention is shown. As FIG. 8 can be viewed as a modification of FIG. 7, similar components in FIG. 8 are designated with similar numbers and are not repeatedly described herein.

In FIG. 8, the first line 551 is partially overlapped and electrically insulated from the common electrode line 512, so as to form a capacitor structure at the overlapped part between the first line 551 and the common electrode line 512. When electrostatic discharge occurs, the capacitor structure generates capacitor coupling effect for discharging the static electricity of the common electrode line 512 via the first line 551. Thus, when static electricity is generated at the common electrode line 512, the static electricity can be quickly discharged via the first line 551.

Sixth Embodiment

Figure 9:
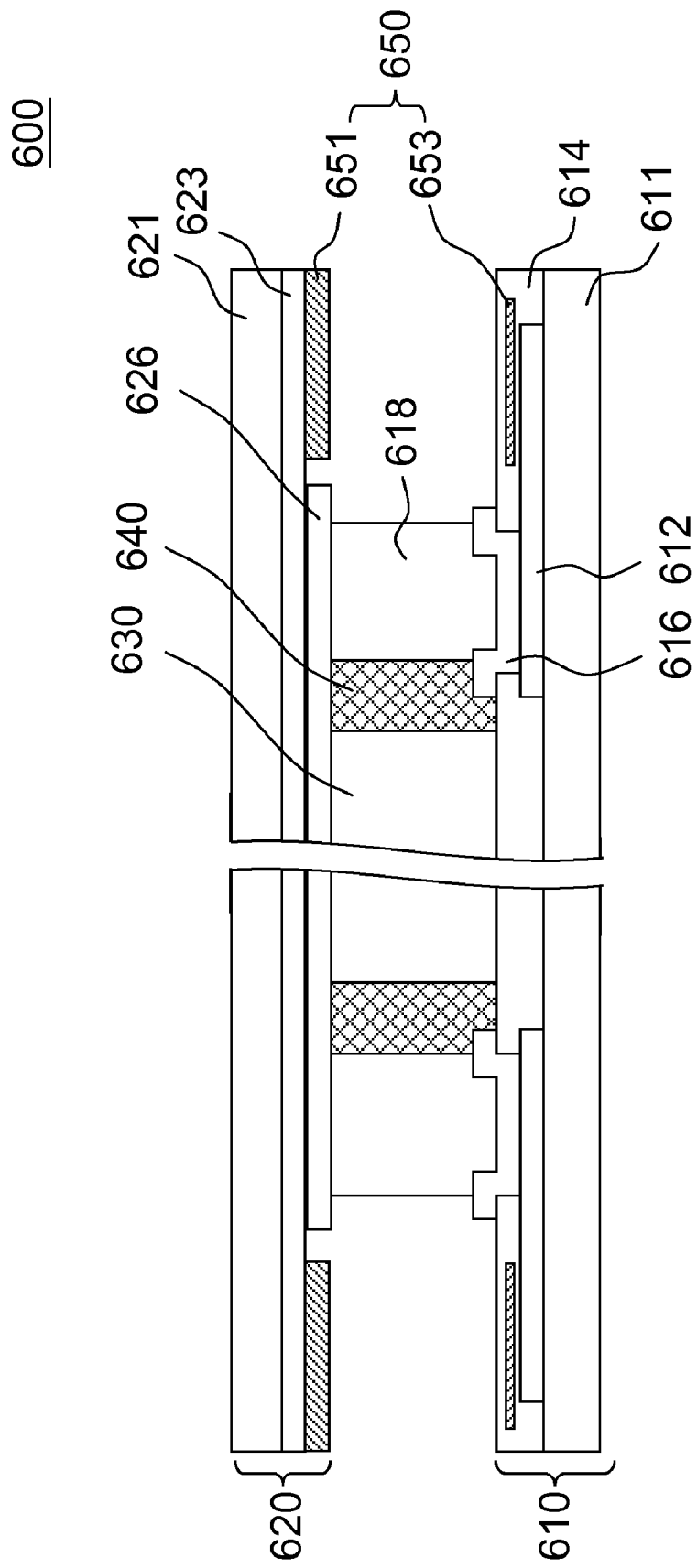
FIG. 9 shows a cross-section view of an LCD panel according to a sixth embodiment of the invention.

The sixth embodiment differs from the fifth embodiment in that a metal layer is disposed between the first line and the common electrode line. In the present embodiment of the invention, the electrostatic protection of the LCD panel is further enhanced by increasing the equivalent capacitance of the capacitor structure. Referring to FIG. 9, a cross-section view of an LCD panel according to a sixth embodiment of the invention is shown. As FIG. 9 can be viewed as a modification of FIG. 8, similar components in FIG. 9 are designated with similar numbers and are not repeatedly described herein.

In FIG. 9, the electrostatic protection structure 650 further includes a metal layer 653 positioned between the first line 651 and the common electrode line 612, and a part of the metal layer 653 is covered by the insulating layer 614. The metal layer 653 is partially overlapped and electrically insulated from the first line 651, so as to form a capacitor structure at the overlapped part between the metal layer 653 and the first line 651. The metal layer 653 is partially overlapped and electrically insulated from the common electrode line 612, so as to form another capacitor structure at the overlapped part between the metal layer 653 and the common electrode line 612, such that static electricity at the common electrode line 612 can be easily and quickly discharged via the metal layer 653 and the first line 651.

Seventh Embodiment

The design of the seventh embodiment is a combination of the first embodiment and the fourth embodiment. In the present embodiment of the invention, except the first line is disposed on the TFT substrate and surrounds the inner edge of the TFT substrate, a second line is disposed on the color filter substrate and surrounds the edge of the color filter substrate. The components and the functions of the present embodiment which are similar to those in the first embodiment are not repeatedly described in the following.

Figure 10:
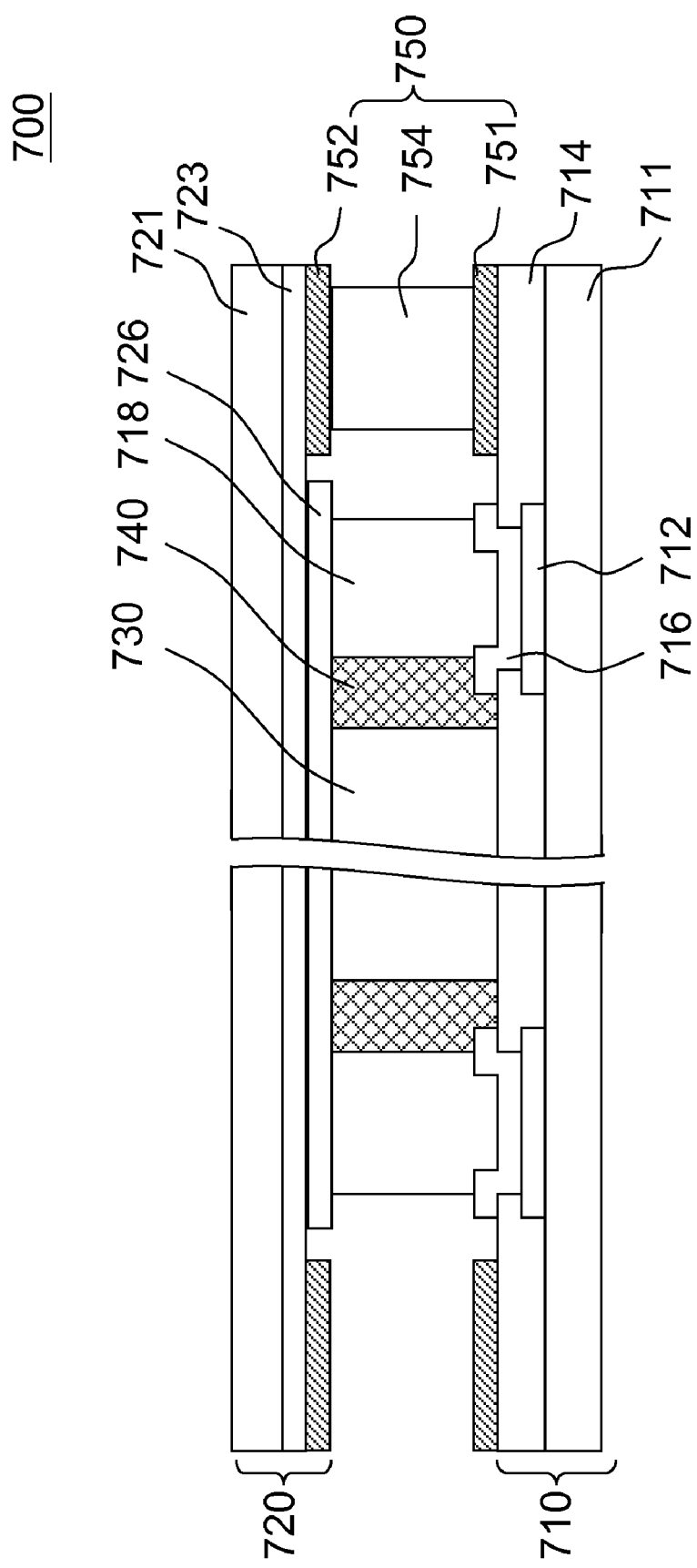
FIG. 10 shows a cross-section view of an LCD panel according to a seventh embodiment of the invention.

Referring to FIG. 10, a cross-section view of an LCD panel according to a seventh embodiment of the invention is shown. As indicated in FIG. 10, the LCD panel 700 includes a TFT substrate 710, a color filter substrate 720, a liquid crystal layer 730, a sealant 740 and an electrostatic protection structure 750. The electrostatic protection structure 750 includes a first line 751 and a second line 752. The TFT substrate 710 includes a transparent substrate 711, a common electrode line 712, an insulating layer 714, an ITO electrode layer 716 and an electric conductor 718. The color filter substrate 720 includes a transparent substrate 721, a black matrix layer 723 and a common electrode 726. The electric conductor 718 is coupled to the ITO electrode layer 716 and the common electrode 726. The first line 751 of the present embodiment is disposed on the insulating layer 714 of the TFT substrate 710 and surrounds the inner edge of the TFT substrate 710. The second line 752 is disposed on the color filter substrate 720 and surrounds the inner edge of the color filter substrate 720, and the second line 752 is opposite to the first line 751.

Likewise, the first line 751 and the second line 752 can be floating or grounded. Preferably, the first line 751 and the second line 752 are grounded. In the present embodiment of the invention, the electrostatic protection structure 750 may further include one or several electric conductor 754. The electric conductors 754, 718 can be made of the same material, such as conductive glue or silver conductive adhesive, and the electric conductors 754, 718 can be simultaneously formed in the same manufacturing step. The electric conductor 754 is for coupling the first line 751 to the second line 752, such that the second line 752 is grounded via the electric conductor 754 and the first line 751.

The functions of the first line 751 and the second line 752 of the present embodiment are similar to those of the first embodiment and the fourth embodiment. That is, the first line 751 and the second line 752 are capable of discharging accumulated electrostatic charges so as to achieve excellent electrostatic protection effect. The inner sides of the first line 751 and the second line 752 can be saw-toothed for increasing the possibility of point discharge, such that the electrostatic charges can be more easily to be transmitted to the first line 751 and the second line 752 and be discharged from the first line 751 and the second line 752 accordingly. The first line 751 and the second line 752 can be made of the same material as that of the ITO electrode layer 716 and the common electrode 726. Therefore, the first line 751 can be simultaneously formed in the step of forming the ITO structure of the TFT substrate, and the second line 752 can be simultaneously formed in the step of forming the ITO structure of the color filter substrate without incurring additional manufacturing cost.

Eighth Embodiment

Figure 11:
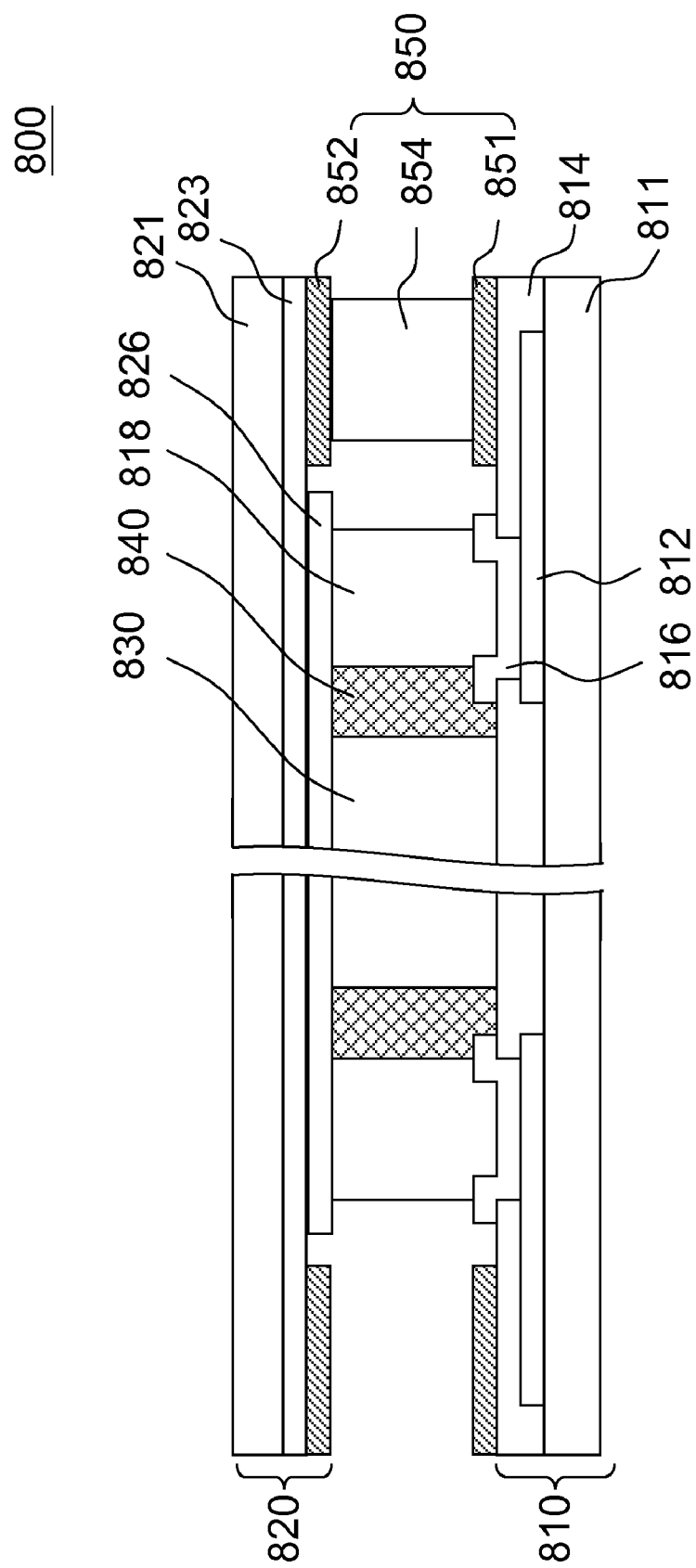
FIG. 11 shows a cross-section view of an LCD panel according to a eighth embodiment of the invention.

The eighth embodiment differs from the seventh embodiment in the disposition relationship between the common electrode line and the electrostatic protection structure. In the present embodiment of the invention, the electrostatic protection of the LCD panel is further enhanced by changing the disposition relationship between the common electrode line and the electrostatic protection structure. Referring to FIG. 11, a cross-section view of an LCD panel according to a eighth embodiment of the invention is shown. As FIG. 11 can be viewed as a modification of FIG. 10, similar components in FIG. 11 are designated with similar numbers and are not repeatedly described herein.

In FIG. 11, the first line 851 is partially overlapped and electrically insulated from the common electrode line 812, such that a capacitor structure is formed at the overlapped part between the first line 851 and the common electrode line 812. The second line 852 is also partially overlapped and electrically insulated from the common electrode line 812. When electrostatic discharge occurs, the capacitor structure generates capacitor coupling effect for discharging the static electricity of the common electrode line 812 via the first line 851. Thus, when static electricity is generated at the common electrode line 812, the static electricity can be quickly discharged via the first line 851.

Ninth Embodiment

Figure 12:
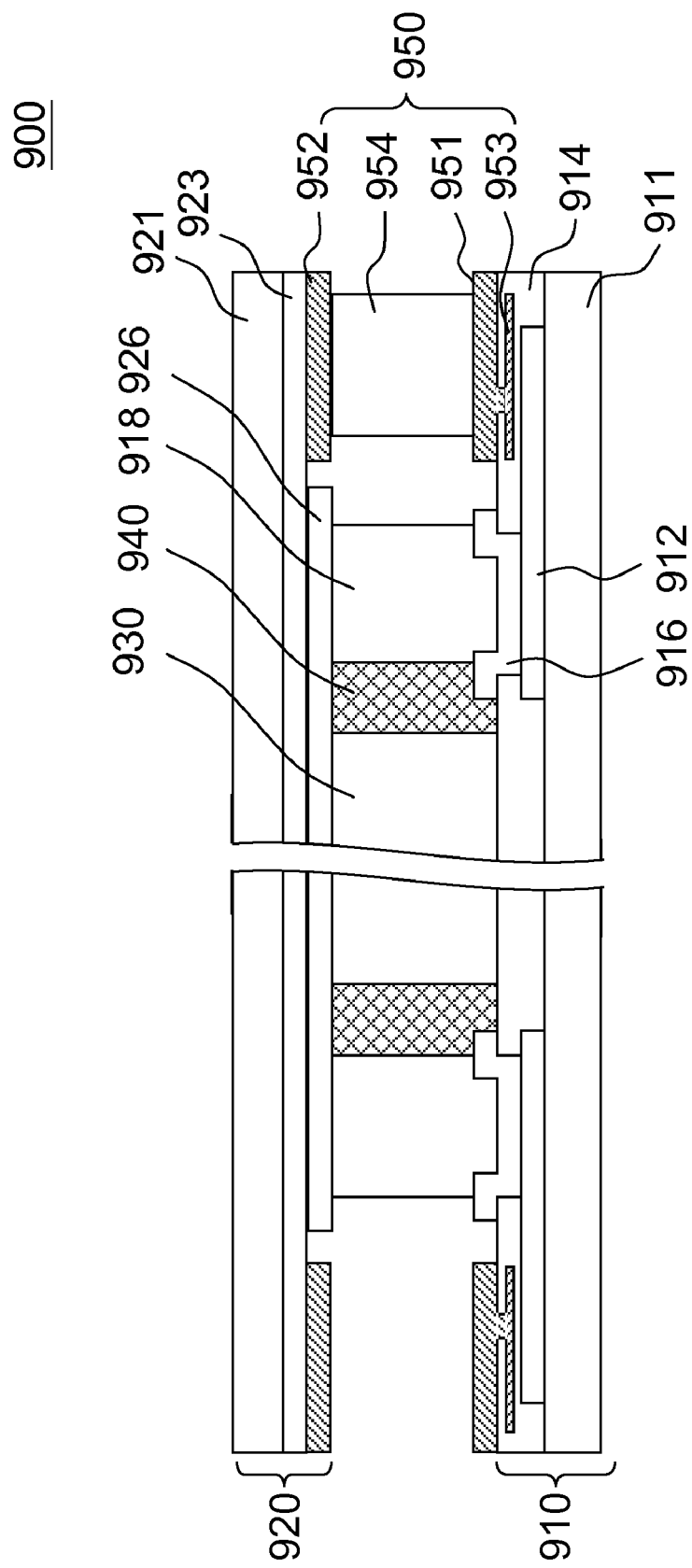
FIG. 12 shows a cross-section view of an LCD panel according to a ninth embodiment of the invention.

The ninth embodiment differs from the eighth embodiment in that a metal layer is disposed between the first line and the common electrode line. In the present embodiment of the invention, the electrostatic protection of the LCD panel is further enhanced by increasing the equivalent capacitance of the capacitor structure. Referring to FIG. 12, a cross-section view of an LCD panel according to a ninth embodiment of the invention is shown. As FIG. 12 can be viewed as a modification of FIG. 11, similar components in FIG. 12 are designated with similar numbers and are not repeatedly described herein.

In FIG. 12, the electrostatic protection structure 950 further includes a metal layer 953 positioned between the first line 951 and the common electrode line 912, and a part of the metal layer 953 is covered by the insulating layer 914. The metal layer 953 is electrically connected to the first line 951 and is partially overlapped and electrically insulated from the common electrode line 912, so as to form a capacitor structure at the overlapped part between the metal layer 953 and the first line 951. The second line 952 is partially overlapped and electrically insulated from the common electrode line 912. Thus, the static electricity accumulated at the common electrode line 912 can be more quickly and easily discharged via the metal layer 953 and the first line 951.

According to the results of electrostatic discharge test, the electrostatic protection of each of the LCD panels of the above embodiments is more than 8 KV and thus far outdoes that of the conventional LCD panel which is only 2 KV. Meanwhile, the manufacturing process of the electrostatic protection structure of each above embodiment can be integrated with the original manufacturing process of LCD panels without incurring more manufacturing cost, hence greatly increasing product competitiveness.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A liquid crystal display (LCD) panel, comprising:
   a first substrate and a second substrate disposed in parallel to each other;
   a liquid crystal layer;
   a sealant for sealing the liquid crystal layer between the first substrate and the second substrate; and
   an electrostatic protection structure disposed within a non-display area outside the sealant, wherein the electrostatic protection structure comprises:
   a first line disposed on the first substrate and surrounding the edge of the first substrate,
   wherein the first substrate has at least one common electrode line partially overlapped and electrically insulated from the first line,
   wherein the first substrate has an insulating layer which covers the common electrode line, and the electrostatic protection structure further comprises:
   a metal layer positioned between the first line and the common electrode line, wherein a part of the metal layer is covered by the insulating layer, and the metal layer is electrically connected to the first line and is partially overlapped and electrically insulated from the common electrode line.

2. The LCD panel according to claim 1, wherein the first substrate is a thin film transistor (TFT) substrate.

3. The LCD panel according to claim 1, wherein the second substrate is a color filter substrate.

4. The LCD panel according to claim 1, wherein the side of the first line facing the sealant is saw-toothed.

5. The LCD panel according to claim 1, wherein the first line is made of indium tin oxide (ITO).

6. The LCD panel according to claim 1, wherein the first line is grounded.

7. The LCD panel according to claim 1, wherein the first line is floating.

8. A liquid crystal display (LCD) panel, comprising:
   a first substrate and a second substrate disposed in parallel to each other;
   a liquid crystal layer;
   a sealant for sealing the liquid crystal layer between the first substrate and the second substrate; and
   an electrostatic protection structure disposed within a non-display area outside the sealant, wherein the electrostatic protection structure comprises:
   a first line disposed on the first substrate and surrounding the edge of the first substrate, and
   a second line disposed on the second substrate and surrounding the inner edge of the second substrate, and the second line is opposite to the first line,
   wherein the first substrate has at least one common electrode line, the first line is partially overlapped and electrically insulated from the common electrode line, and the second line is partially overlapped and electrically insulated from the common electrode line,
   wherein the first substrate has an insulating layer which covers the common electrode line, and the electrostatic protection structure further comprises:
   a metal layer positioned between the first line and the common electrode line wherein a part of the metal layer is covered by the insulating layer, the metal layer is electrically connected to the first line and is partially overlapped and electrically insulated from the common electrode line, and the second line is partially overlapped and electrically insulated from the common electrode line.

9. The LCD panel according to claim 8, wherein the second line is floating.

10. The LCD panel according to claim 8, wherein the second line is grounded.

11. The LCD panel according to claim 8, wherein the first line is grounded, and the electrostatic protection structure further comprises:
an electric conductor for electrically connecting to the first line and the second line, such that the second line is grounded.

12. A liquid crystal display (LCD) panel, comprising:
a first substrate and a second substrate disposed in parallel to each other;
a liquid crystal layer;
a sealant for sealing the liquid crystal layer between the first substrate and the second substrate; and
an electrostatic protection structure disposed within a non-display area outside the sealant, wherein the electrostatic protection structure comprises:
a first line disposed on the second substrate and surrounding the edge of the second substrate,
wherein the first substrate has at least one common electrode line partially overlapped and electrically insulated from the first line,
wherein the first substrate has an insulating layer which covers the common electrode line, and the electrostatic protection structure further comprises:
a metal layer positioned between the first line and the common electrode line and covered by the insulating layer, wherein the metal layer is partially overlapped and electrically insulated from the first line and the common electrode line.

13. The LCD panel according to claim 12, wherein the first substrate is a thin film transistor (TFT) substrate.

14. The LCD panel according to claim 12, wherein the second substrate is a color filter substrate.

* * * * *